Dec. 21, 1965 I. F. WEISS 3,225,264

WIRE WAY FOR ELECTRICAL CONTROL PANEL

Filed Oct. 13, 1961

INVENTOR.
IRVING F. WEISS

BY Watts Edgerton Pyle & Fisher

ATTORNEYS 3,225,264

WIRE WAY FOR ELECTRICAL CONTROL PANEL

Irving F. Weiss, University Heights, Ohio, assignor to ECP Corporation

Filed Oct. 13, 1961, Ser. No. 145,031
11 Claims. (Cl. 317—119)

This invention relates to wire way construction and covers for the concealment of electrical conductors interconnecting a series of electrical components.

Electrical apparatus has long been controlled from remote positions known as switchboards. An electrical equipment is adapted more in the serving of human needs and as electronic equipment is developed to a greater extent, electrical controls, relays, indicators and similar equipment mounted on panels is becoming more widely used.

As an example only, electrical relays are usually mounted on control panels. In a complex control system a board containing many relays in several rows is common. The conductors interconnecting these relays are led through the natural channels created by the spaced rows of relays and often such wiring will completely fill the channel area. Such a mass of wire is not only unsightly, but is also subject to accidental damage from outside forces. It is therefore desirable to cover the wire in order to protect as well as to hide it.

There have been many wire way devices proposed and actually used, some of which are quite complex and others quite simple. This invention provides an exceptionally reliable cover at an exceptionally low price that it is being accepted in the place of many more complex devices of prior inventions.

The wire way cover of this invention is designed to cover the space between rows of electrical components, such as relays, and will be most commonly used when it is not necessary to provide a bottom and side insulator. Nevertheless, it could be used with a pre-installed channel.

Accordingly, an object of this invention is to provide a simplified wire way channel cover easily installed and readily removable.

Other objects and a fuller understanding of the invention may be had by referring to the following description and claims taken in conjunction with the accompanying drawings in which:

Figure 1:
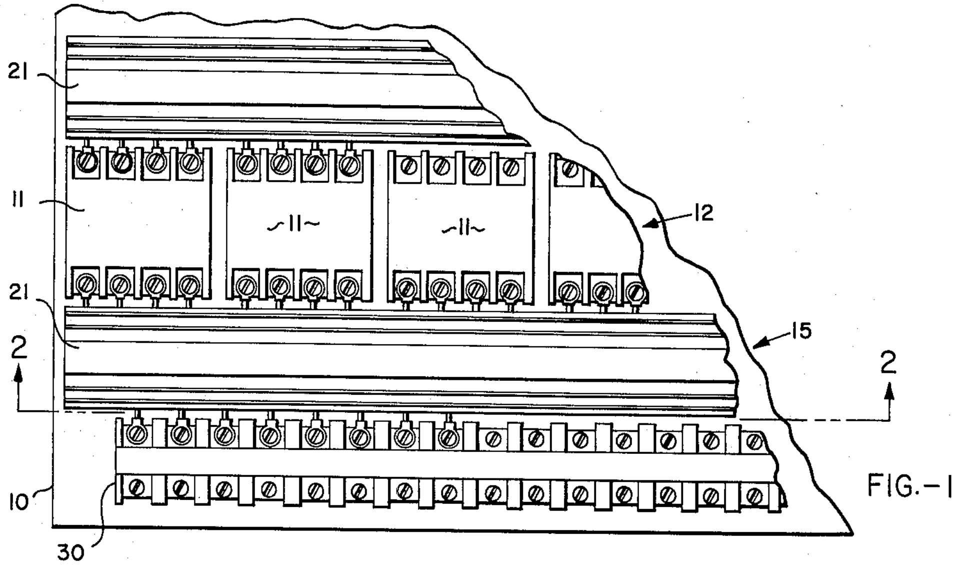
FIGURE 1 is a view of a control panel board having a series of relay members in rows with the spaces between the relays covered by the wire way cover of this invention.
Figure 2:
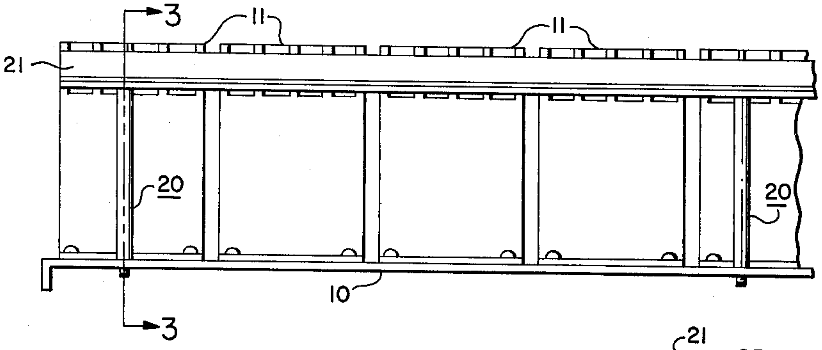
FIGURE 2 is a section taken along the line 2—2 of FIGURE 1 but eliminating most of the electrical conductors in order to show construction relationship of the board and the wire way cover.

To illustrate this invention such that it can be readily understood for any application, a relay panel has been chosen as environment for the illustrated embodiment.

The control board of panel has a physical base member 10 upon which a plurality of relays 11 are placed in rows 12. The illustrated relays are of the type having no moving exterior parts and hence wiring may lay alongside the relays without protection. The wiring is simply fed from one relay to another and to an external terminal bar 30 by laying it in the open channels 15 formed between the rows 12.

The new and novel wire way cover of this invention is embodied in a cooperative relationship between a composite post 20 and a resilient plastic cover 21. Although "snap-on" members are very old and well-known, the particular relationship of post and cover in the environment of a panel control board in the relationship shown is quite novel and desirable.

It is unwise to extend a metal post through a series of conductors such as those lying in the open channels between the relays. Hence, the post 20 is a composite of an insulating sleeve 22 and a metal mounting screw 23. The top of the insulating sleeve 22 is necked inwardly and the screw 23 is of the type having a round head. The metal of the round head screw blends with the top of the insulating post and together with the necked portion of the post presents a wedge end having a hard and smooth semi-spherical top surface with a tapered neck portion.

Thus, a very soft insulating material may be used for the post 20. If harder material is available it does not have to be formed to provide a smooth or round projection end. The composite of holding screw and insulating post forms the wedge top quite naturally and inexpensively.

The purpose of the wedge top on the insulated post 20 is to provide a tongue surface which may be rigidly engaged by the mating groove in the cover 21. The groove in the cover takes the form of a channel configuration best seen in FIGURE 3. The channel portion of the cover, indicated by reference character 25, has sloping side walls 26 extending toward one another in order to form a smaller entrance opening than the interior of the channel. Thus, the cover may be forced over the wedge top of the post and rigidly held thereto by the resilient action of the cover. The function of the rounded post should now be clear and readily understandable.

To install the cover of this invention the locations for several of the posts 20 along the channel area are determined and marked for drilling. The holes are usually drilled at the same time holes are drilled to mount the relays. After the relays are mounted and wired and the board is otherwise finished, the insulated post is installed by extending the threaded end of the screw, which extends beyond the bottom of the insulated sleeve, through the hole in the board. A nut is tightened down upon the threaded end and thus binds the insulated post 20 into an upright position. Then the cover 21 is placed with the mouth of the channel 25 in contact with the rounded end of the screw and given a sharp rap to cause the hard, smooth metal dome of the screw to wedge apart the channel of the cover and allow the top cover to open and snap shut again over the post top configuration. Removal is simply the reverse wedge action and is accomplished with little physical effort.

By proper location of the relays with respect to one another and by making the cover 21 with side flanges of proper dimension it is apparent that the cover will bridge between the relays and provide a neat concealing cover, completely shielding and hiding the wiring.

A terminal bar 30 is illustrated in the drawing. Such termnial bars are used as a convenient means to connect a panel control board into a complete electronic circuit. The terminal bar 30 is physically considerably thinner than even the modern new 300 watt relays illustrated in the drawing. Therefore, in order to make a completely harmonious aesthetic appearance the bar 30 is mounted on posts 31 in order to place the connection surface at substantially the same plane as the surface of the adjacent row of relays. Accordingly, the last cover will extend from the relays to the terminal bar just as the other covers extend between the relays. Thus, instead of having one edge of a cover extend free and allowing a viewer to see the wiring under the cover, the raising and location of the terminal bar permits a finished appearance. The wiring under the cover may still be observed by the deliberate effort of walking beside the board and looking under the bar 30. However, to the usual observer the board has a finished appearance.

Figure 3:
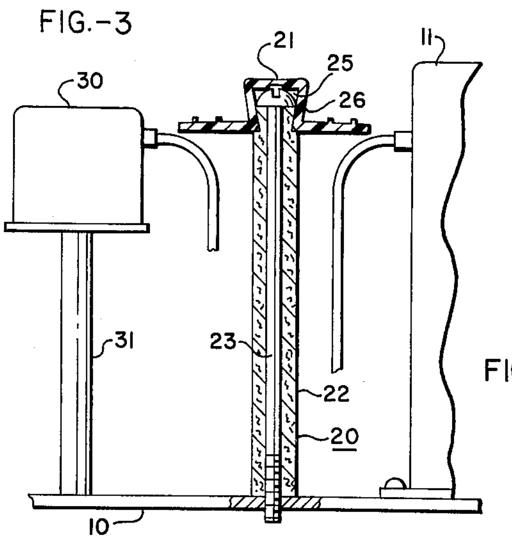
FIGURE 3 is a lateral cross section through the cover and supporting post taken along line 3—3 of FIGURE 3 and showing the novel construction detail; and, FIGURE 4 is a view as FIGURE 3 with an alternate post construction.
Figure 4:
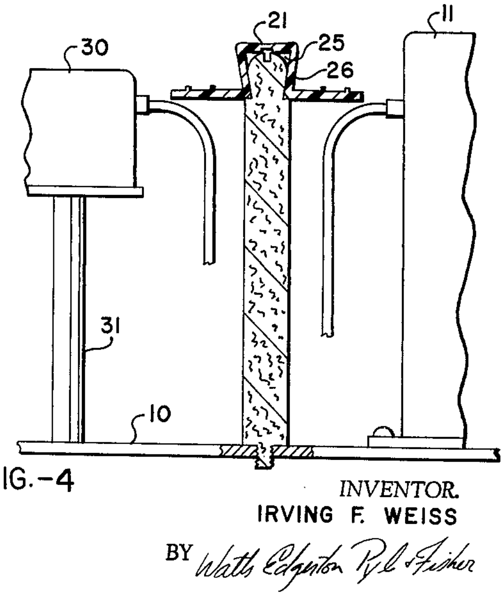

The FIGURE 4 illustrates an alternate embodiment which has some aspects more useful than the composite structure of FIGURE 3. In this FIGURE 4 the post is of solid synthetic material such as of hard Du Pont nylon. This material is well-known and similar materials are widely used and available. The particular material is not of significance other than that it is non-conductive, and has a relatively rigid, abrasive-resistant structure which can be threaded, as the post in FIGURE 4 is threaded, to accept a steel tightening nut. Thus the post may be installed just as the composite post of FIGURE 3.

Additionally, one of the novel features of this invention resides in the structure of the cover itself by the provision of the longitudinal channel 25 positioned above the plane of the cover rather than forming such channel by the provision of two side walls directed below the level of the cover. By this type of structure convenient finger grip is provided having the desired inwardly sloping walls. Thus the cover may be removed by grasping this long handle near one end of the cover and stripping the cover from the series of posts. Tools and exposing of hands to electrical wiring are eliminated.

This invention therefore provides a unique and desirable combination of a relay panel wherein the electrical devices are placed in rows with channel areas between the rows, and wherein the channels are covered by resilient cover members extending along the channels, and which covers are adapted to removably engage a series of posts projecting between the devices along the channels. Also, it must not be overlooked that the raising of the connector bar is a new and novel means of producing a finished end appearance to such a construction embodying this novel construction.

Although the invention has been described in its preferred form with a certain degree of particularity it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electrical panel comprising:
(a) a panel board;
(b) a plurality of electrical devices arranged on the panel board in spaced, parallel rows so that the space between the rows of devices forms an open wireway channel extending substantially the length of the rows and having its sides defined by the rows of devices and its bottom defined by the panel board;
(c) a plurality of anchor posts carried by said panel board in standing relation between the rows of devices and aligned substantially along the center line of the wireway channel, and said anchor posts having a maximum lateral dimension substantially less than the width of the space between the rows so as to permit electrical wires connected to the devices to extend longitudinally through the wireway channel; and,
(d) an elongated cover plate carried by said anchor posts and disposed in spaced, substantially parallel relation to the panel board so as to substantially cover and enclose the wireway channel.

2. An electrical panel comprising, a panel board, a plurality of electrical devices mounted on said board, said devices arranged in spaced, substantially parallel rows so as to form a wire way channel extending longitudinally between the rows, a plurality of anchor posts carried by the panel board and aligned substantially along the centerline of each channel, said anchor posts having a maximum lateral dimension in the wireway channel substantially less than the width of the space between the rows so as to permit electrical wires connected to the devices to extend longitudinally through the wireway channel, each anchor post having a wedge top cam form with a neck spaced from the top, and a resilient strip cover plate carried by said anchor posts and disposed in spaced, substantially parallel relation to the panel board so as to substantially cover the wireway channel, said cover plate having a central channel defined by converging side walls, said side walls formed and adapted to snap over said anchor post top and hold thereto with a grip fit.

3. The panel of claim 1 including, in combination:
(e) said cover plate having a resilient, longitudinally extending channel portion adapted to snap over the ends of the anchor posts to releasably connect the cover plate to the anchor posts.

4. An electrical panel comprising, a panel board, a plurality of electrical devices mounted in rows on said panel board, the rows of electrical devices being in spaced relation to provide a wire way channel for receiving and containing electrical wires connected to said electrical devices, support means having one end carried by said panel board and the other end formed in shape of a locking wedge, said support means having a lateral dimension in the wireway channel substantially less than the width of the space between the rows of electrical devices so as to permit electrical wires connected to the devices to extend longitudinally through the wireway channel, and resilient cover means carried by said support means in spaced, substantially parallel relation to said panel board and having a channel portion rigidly gripping the wedge-shaped end of said support means to removably cover the wire way channel between said rows of electrical devices.

5. The combination of claim 4 wherein the support means comprises a plurality of anchor posts each having an inverted wedge-shaped end, each anchor post comprising an outer tubular member with a round head bolt extending therethrough, the round head of the bolt being in abutting relation to the largest portion of the wedge-shaped end of the anchor post to form a hard semi-spherical top surface therefor.

6. An electrical panel comprising, a panel board, a plurality of electrical devices mounted in a row on said panel board, a terminal board mounted on said board in an elevated position, the top connector surface of said terminal board being in approximately the plane of the top surface of the electrical devices, said terminal board and said row of electrical devices being in a spaced relation to provide a wire way channel, a plurality of anchor posts each having one end secured to said panel board and the other end formed in the shape of an inverted wedge, an elongated cover member carried by the anchor posts in spaced relation to the panel board, said cover member including parallel, longitudinally extending channel and cover portions, said channel portion rigidly gripping the wedge-shaped ends of said anchor posts to removably secure said cover means to said anchor posts, and said cover portion extending laterally between the terminal board and the row of electrical devices and above the panel board so as to be substantially in the plane of said top connector surface.

7. A structure for covering long, narrow passageways defined by a floor and side walls comprising, support means, said support means being a plurality of anchor posts each having one end secured to the floor along the passageway, the other end of the anchor post being wedge-shaped so as to give the appearance of a dove-tail tongue in outline, and a resilient cover plate having a channel portion with converging sidewalls which rigidly clip over the wedge-shaped ends of said anchor posts to cover said passageways.

8. An anchor post for the releasable, rigid support of a resilient cover over a long, narrow channelway comprising, a tubular member, one end of the tubular member being tapered inwardly from the end so as to give the appearance of a dovetail tongue in outline, a round head metal bolt extending through the center of the tubular member with the bolt head in abutting relation to the edge surface of the tapered end and a portion of the threaded end of the bolt extending out beyond the other end of the tubular member for securing the anchor post to the floor of the channelway, the bolt head having approximately the same diameter as the tubular member to form a hard semi-spherical end surface for the tapered end of the tubular member.

9. An electrical panel comprising:

(a) a panel board;

(b) a plurality of electrical devices having electrical terminal portions adjacent a side surface and near an outer top surface for connection to electrical wires, said electrical devices being arranged on the panel board in a row with the electrical terminal portions to one side of the row;

(c) an anchor support means carried by the panel board in standing relation thereto and in spaced, substantially parallel relation to the row of devices so that the space between the row of devices and the support means forms a wireway channel extending substantially the length of the row of devices and having its bottom and at least one of its sides defined by the panel board and the row of devices respectively, said anchor support means having a lateral dimension in the wireway substantially less than the width of the wireway channel so that electrical wires may extend throughout the length of the wireway channel;

(d) an elongated cover plate carried by said anchor support means and disposed in spaced, substantially parallel relation to the panel board so as to substantially cover and at least partially enclose the wireway channel; and, (e) said cover plate extending laterally from said anchor support means to a longitudinal edge in spaced, parallel relation to the side surface of the electrical devices and above the electrical terminal portions so that wires connected to the terminal portions may extend under the cover and longitudinally through the wireway channel.

10. An electrical panel comprising:

(a) a panel board;

(b) a plurality of electrical devices each having an electrical terminal portion adjacent a side surface, said electrical devices being arranged on the panel board in a row with the electrical terminal portions to one side of said row;

(c) a plurality of anchor posts carried by said panel board in standing relation to it and aligned in spaced, substantially parallel relation to said side surfaces of said electrical devices so as to define an open wireway channel extending substantially the length of the row of devices and having at least one side defined by said side surface and its bottom defined by said panel board;

(d) said anchor posts each having one end connected to the panel board and having an inwardly tapered locking surface adjacent its other end;

(e) an elongated cover plate carried by the anchor posts and disposed in spaced, substantially parallel relation to the panel board so as to substantially cover the wireway channel, said elongated cover plate extending laterally to adjacent said side surfaces and approximately on the level of the electrical terminal portions so that wires connected to the terminal portions may extend under the cover and longitudinally through the wireway channel;

(f) said cover having a longitudinally extending resilient channel portion defined by converging side walls, said side walls being formed and adapted to snap over the locking surface of the anchor posts to releasably connect said cover to the anchor posts.

11. A cover device for enclosing a wireway channel, comprising:

(a) an elongated member made of a resilient material;

(b) said member having parallel, longitudinally extending planar and channel portions;

(c) said planar portion extending laterally to form a wireway channel cover; and, (d) said channel portion including an elongated back wall and elongated side walls each having one of their longitudinal edges connected to said back wall and at least one of the side walls having the other of its longitudinal edges connected to said planar portion, and said side walls converging inwardly from said back wall so as to form a detachable anchor support gripping structure between them.

References Cited by the Examiner

UNITED STATES PATENTS

| | | | |
|---|---|---|---|
| 2,590,559 | 3/1952 | Miller | 174—138 |
| 2,740,001 | 3/1956 | Vergilio et al. | 174—138 |
| 2,790,113 | 4/1957 | Brown | 317—119 |

JOHN F. BURNS, *Primary Examiner*.

DARRELL L. CLAY, *Examiner*.